United States Patent
Prakash et al.

(10) Patent No.: US 7,653,037 B2
(45) Date of Patent: Jan. 26, 2010

(54) SYSTEM AND METHOD FOR DISTRIBUTING WIRELESS NETWORK ACCESS PARAMETERS

(75) Inventors: Rajat Prakash, San Diego, CA (US); Nikhil Jain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 195 days.

(21) Appl. No.: 11/238,811

(22) Filed: Sep. 28, 2005

(65) Prior Publication Data

US 2007/0070935 A1    Mar. 29, 2007

(51) Int. Cl.
    *H04W 4/00* (2006.01)
(52) U.S. Cl. ............... 370/338; 370/352; 370/342; 370/335; 370/328; 455/432.1; 455/435.1; 455/435.2; 455/426.1; 455/418; 455/552.1; 455/553.1; 455/419; 455/420
(58) Field of Classification Search ......... 370/328, 370/331, 332, 338; 455/41.1, 41.2, 411, 455/552.1, 553.1, 556.2, 422.1, 418–420, 455/426.1, 435.1, 435.2
See application file for complete search history.

(56) References Cited

U.S. PATENT DOCUMENTS

| 7,254,119 | B2 * | 8/2007 | Jiang et al. ............... 370/328 |
| 2003/0087629 | A1 * | 5/2003 | Juitt et al. ............... 455/411 |
| 2003/0133421 | A1 * | 7/2003 | Sundar et al. ............... 370/328 |
| 2005/0122941 | A1 | 6/2005 | Wo et al. |
| 2005/0154895 | A1 | 7/2005 | Zhang |
| 2005/0202809 | A1 * | 9/2005 | Lappetelainen et al. .. 455/422.1 |
| 2005/0233729 | A1 * | 10/2005 | Stojanovski et al. ........ 455/411 |
| 2005/0282544 | A1 * | 12/2005 | Oommen et al. ......... 455/432.1 |
| 2006/0178131 | A1 | 8/2006 | Huotari et al. |

FOREIGN PATENT DOCUMENTS

| EP | 1311136 | 5/2003 |
| EP | 1492302 | 12/2004 |
| EP | 1492364 | 12/2004 |

OTHER PUBLICATIONS

International Search Report dated Feb. 1, 2007 for PCT/US2006/038533.

* cited by examiner

*Primary Examiner*—Dwayne Bost
*Assistant Examiner*—Amancio Gonzalez
(74) *Attorney, Agent, or Firm*—Albert J. Harnois; Florin Corie (57) ABSTRACT

A system and method are provided for distributing wireless network access parameters in a multi-mode communications user terminal (UT). The method includes: establishing a link between a UT and a first communications network (i.e., a cellular network); accessing a parameters server via the first network; downloading access parameters for a wireless, second communications network (i.e., a Wireless Local Area Network); and, using the downloaded access parameters to establish a wireless link between the UT and the second communications network. The downloaded access parameters may include information such as a security key, Service Set IDentifier (SSID), traffic channel allocation, and optimization parameters including transmit power, quality of service (QoS) settings, and operational mode. Alternately, the database may cross-reference UT ID to parameters such as QoS, IP address, gateway information, subnet mask, Domain Name Server (DNS) information, or geographical location.

25 Claims, 5 Drawing Sheets

FIG. 1

PARAMETERS SERVER ⌐116

BASE TERMINAL
- MAC ADDRESS
- NETWORK ID
- SECURITY KEY
- SSID
- TRAFFIC CHANNEL
- WEP SETUP
- OPTIMIZATION PARAMETERS
- TRANSMIT POWER
- RECEIVE POWER
- TRANSFER RATE
- QoS
- OPERATION MODE

UT
- QoS
- IP ADDRESS
- GATEWAY
- SUBNET MASK
- DNS
- GEOGRAPHIC LOCATION
- . . .

SYSTEM AND METHOD FOR DISTRIBUTING WIRELESS NETWORK ACCESS PARAMETERS

BACKGROUND OF THE INVENTION

1. Field of the Invention

This invention generally relates to wireless communications and, more particularly, to a system and method for providing access parameters for a wireless communications network that are obtained for a user terminal via a different communications network.

2. Description of the Related Art

A conventional Wireless Local Area Network (WLAN) typically includes an Access Point (AP) hard-wired to an Internet Protocol (IP) network. Mobile user terminals (UTs) such as a notebook computer, Personal Digital Assistant (PDA), or a multi-mode cellular telephone wirelessly communicate with the AP. The AP functions as a bridge between a wired LAN (the IP network) and a wireless LAN, permitting UTs to communicate via the Internet. WLANs generally compliant with IEEE 802.15 and Bluetooth permit a UT to communicate with an AP, up to a distance of about 100 feet. WLANs generally compliant with IEEE 802.11 permit the UT the range up to a distance of about 500 feet from an AP.

Therefore, to maintain communications while in motion, the UT may have to access a new WLAN, or a different AP in the same WLAN. To accomplish this, the UT requires a change in WLAN access information, typically based upon service request areas and their APs. As a practical matter, the ability of a UT to access a WLAN on-the-fly limits the serviceable area of the WLAN and the guarantee of services.

One conventional solution to the access problem has been for WLAN users to manually enter into their UTs, the WLAN access information associated with some frequently-used service areas, such as their home, office, and local café. This WLAN access information may include AP setup information related to the WLAN and TCP/IP-related information. When the user moves from one area to another, they can manually select this preloaded registration information from the UT memory, and use it to register with the proximate AP.

For example, a UT can be preloaded with registration regional information for different WLANs that can potentially be accessed. The regional information registered in the UT includes AP setup information for use in regional APs and network setup information of any UT adapted to access the APs. In use, the WLAN access registration information can be displayed on the UT display, or a representation of the information can be displayed as an icon. The user interface display permits a user to select a particular set of WLAN access information related to region in which the user is currently located.

Although this preloaded registration information method eliminates the need for the user to manually enter registration information from scratch, it is inconvenient in that the user must go through the step of preloading data, and it is inconvenient in that the user must perform the step of manually selecting registration information. Further, this method does not help if the user must access an AP or WLAN for which registration information has not been preloaded. In addition, even if the user is inclined to preload registration information, this method uses memory resources, which are often limited in portable devices.

It would be advantageous if a UT could access a wireless network automatically, without the necessity of manually entering registration information, or maintaining the registration information in the permanent memory of the UT.

SUMMARY OF THE INVENTION

To use a WLAN hot spot (AP), a wireless user must have associated registration information, such as a setup password. Instead of manually entering registration information, or preloading registration information into a UT, the present invention describes a database of access information that can be accessed from an alternate communications network, to provide the needed registration information.

When a UT is in close proximity to an AP, it can detect the Media Access Controller (MAC) address and network identification (ID) associated with that AP. The UT, then, makes a request to an access parameters database (parameters server) to supply the registration information needed for the UT to access the AP. The registration information may include a security key. Security key information is relatively easy to maintain and update if it is kept in a central repository. The UT is not burdened with permanently storing the registration information. Further, the security of the access process is maintained through the link used to communicate with the access parameters database. For example, cellular network security procedures are both effective and well established. If the UT communicates with the access parameters database via a cellular network, then the WLAN security keys are unlikely to be compromised.

Accordingly, a method is provided for distributing wireless network access parameters in a multi-mode communications UT. The method comprises: establishing a link between a UT and a first communications network (i.e., a cellular network); accessing a parameters server via the first network; downloading access parameters for a wireless, second communications network (i.e., a WLAN); and, using the downloaded access parameters to establish a wireless link between the UT and the second communications network.

The downloaded access parameters may include information associated with a WLAN AP such as a security key, Service Set IDentifier (SSID), traffic channel allocation, and optimization parameters including transmit power, quality of service (QoS) settings, and operational mode. Alternately, accessing the parameters server via the first communications network may include: supplying an ID associated with the UT; and, accessing a database cross-referencing the UT ID to parameters such as QoS, IP address, gateway information, subnet mask, Domain Name Server (DNS) information, or geographical location.

Additional aspects of the above-described method and a system for distributing wireless network access parameters are provided in more detail below.

DETAILED DESCRIPTION

Figure 1:
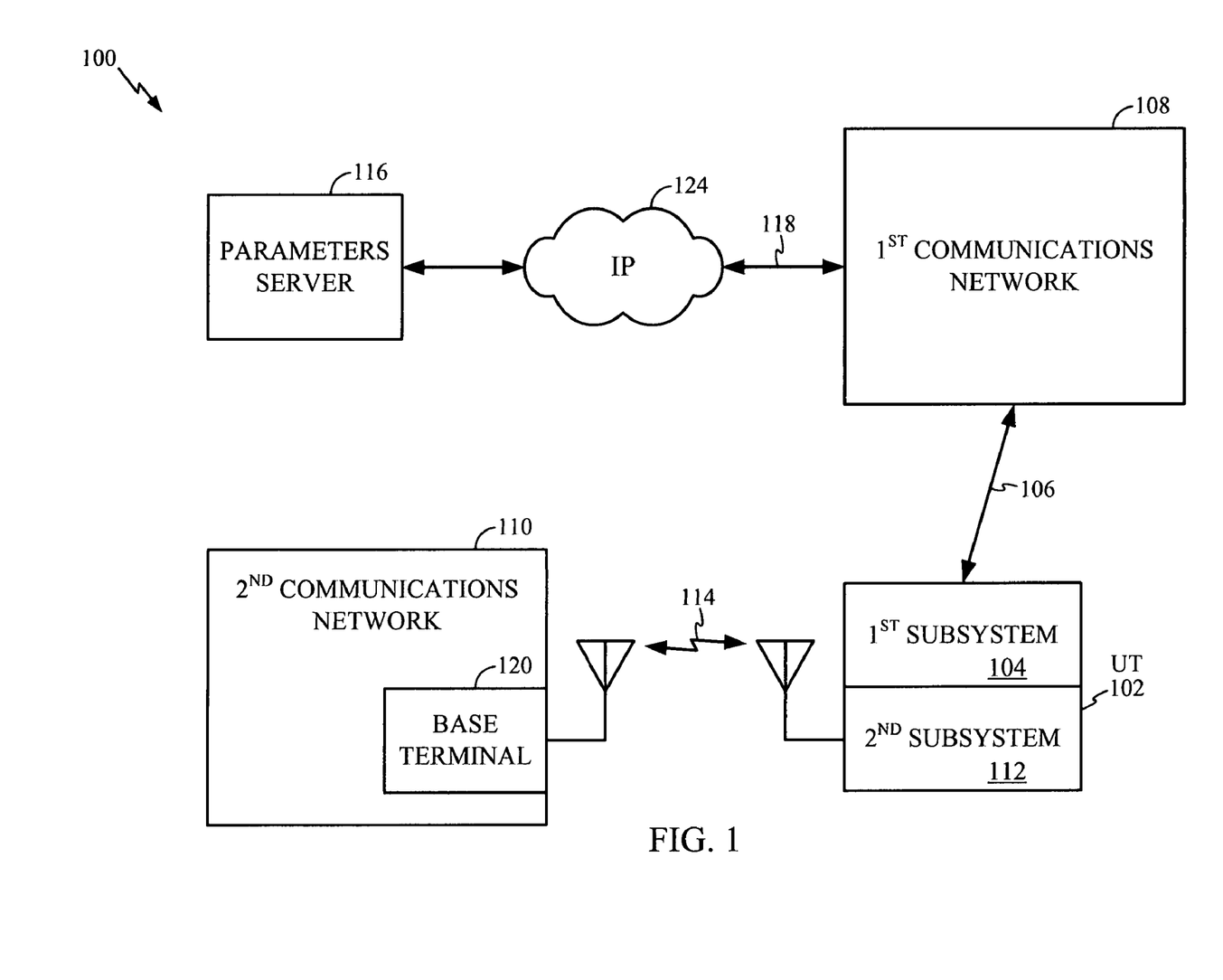
FIG. 1 is a schematic block diagram of a system for distributing wireless network access parameters.

FIG. 1 is a schematic block diagram of a system for distributing wireless network access parameters. The system 100 comprises a multi-mode user terminal (UT) 102. The UT 102 comprises a first subsystem 104 for establishing a link 106 between the UT 102 and a first communications network 108, and for downloading access parameters for a second communications network 110. The first subsystem 104 is enabled using transceiver, de/modulation, and processing circuitry (not shown), as would be understood by one skilled in the art of communications. A second subsystem 112 establishes a wireless communications link 114 between the UT 102 and the second communications network 110, using the access parameters downloaded to the first subsystem 104. Again, the second subsystem 112 includes components such as transceiver, de/modulation, and processing circuitry (not shown). In addition, the first and second subsystems 104/112 may share logic processing circuitry and memory (not shown).

A parameters server 116 has an interface connected to the first network 108 on line 118 for supplying second network access parameters. In one aspect, the first subsystem 104 downloads access parameters for the second communications network 110 associated with a second network wireless terminal 120. For example, the first subsystem 104 may access the parameters server 116 by supplying a MAC address or network ID associated with a second communications network base terminal 120. This MAC address information is information that is acquired in a conventional process where the second subsystem 112 monitors a communication band for broadcast signals, and relays the information captured in monitoring, to the first subsystem 104. Then, the first subsystem 104 accesses the parameters server 116, cross-referencing the MAC address to parameters required to access the base terminal 120. Alternately, the first subsystem 104 may receive an IP address associated with base terminal 120, and the IP information is used to cross-reference access parameters for the base terminal 120.

Figure 2:
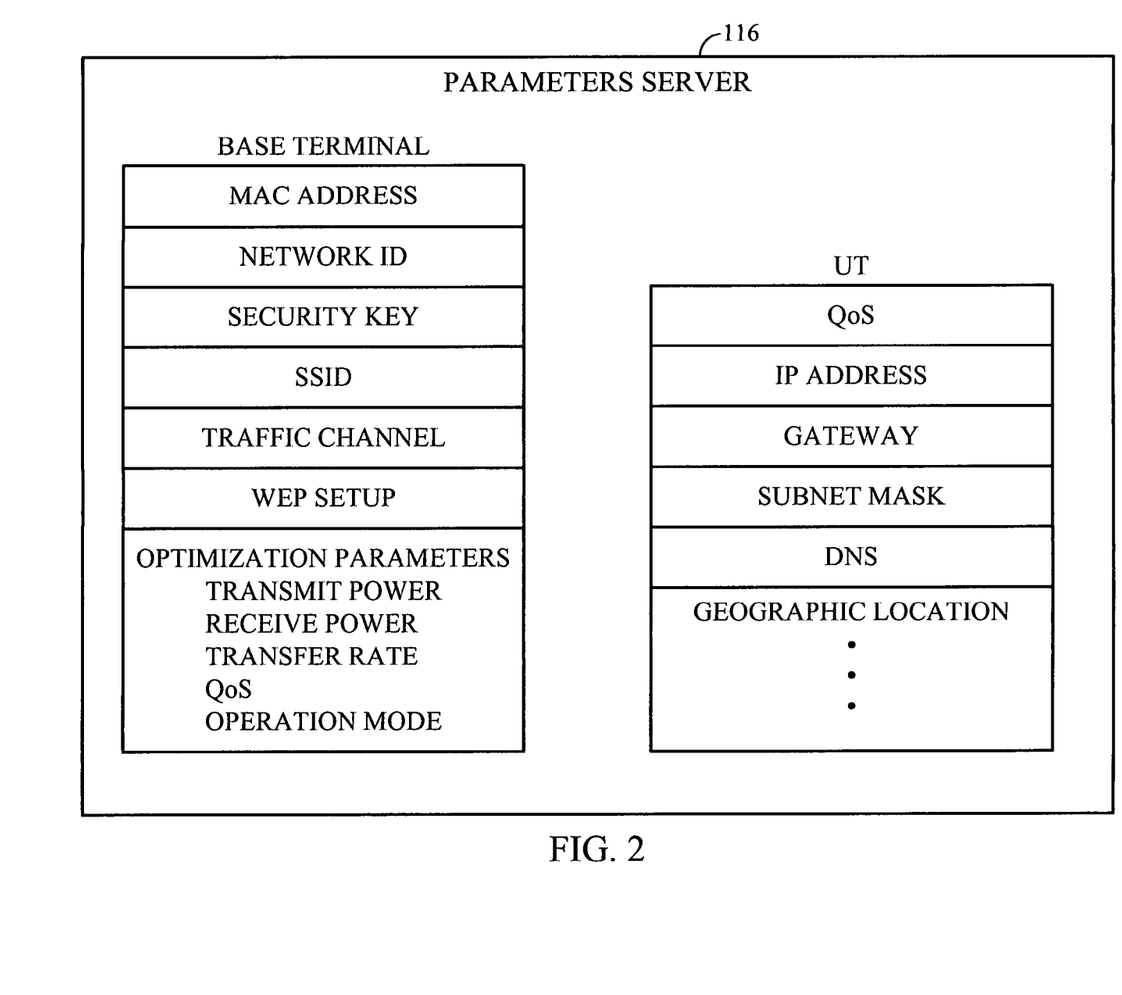
FIG. 2 is a schematic block diagram depicting an exemplary parameters server.

FIG. 2 is a schematic block diagram depicting an exemplary parameters server. Some examples of the types of information that can be downloaded include a security key, Service Set IDentifier (SSID), traffic channel allocation, Wired Equivalent Privacy (WEP) setup data, and optimization parameters such as transmit power, receive power, transfer rate, quality of service (QoS) settings, and operational mode. This list is not intended to exclusively cover every possible kind of registration information that could conceivable be used in quickly establishing a communication link between the second communications network and the UT.

In another aspect, the first subsystem accesses the parameters server by supplying an identity (ID) associated with the UT. The parameters server includes a file that cross-references the UT ID to parameters associated with the UT such as QoS, IP address, gateway information, subnet mask, Domain Name Server (DNS) information, and geographical location.

Returning to FIG. 1, the first communications network 108 may be an Ethernet, IEEE 802.11, IEEE 802.15, Bluetooth, WiMax, a Code Division Multiple Access (CDMA), Global System for Mobile Communications (GSM), or Universal Mobile Telecommunications System (UMTS) cellular telephone network. Although the invention is not limited to just these types of networks, these are examples of networks that can be used by a multi-mode UT to gain access to a parameters server 116 through an IP network 124. Note, the first network 108 need not necessarily communicate to the UT 102 via a wireless medium. That is, link 106 may be a hard-wired link. The second communications network 110 can be an IEEE 802.11, Bluetooth, WiMax, IEEE 802.15, or a cellular telephone network. Again, this is not an exhaustive list of possible networks, but rather, some examples of networks that cannot be used by a UT until access parameters are supplied by that UT.

Figure 3:
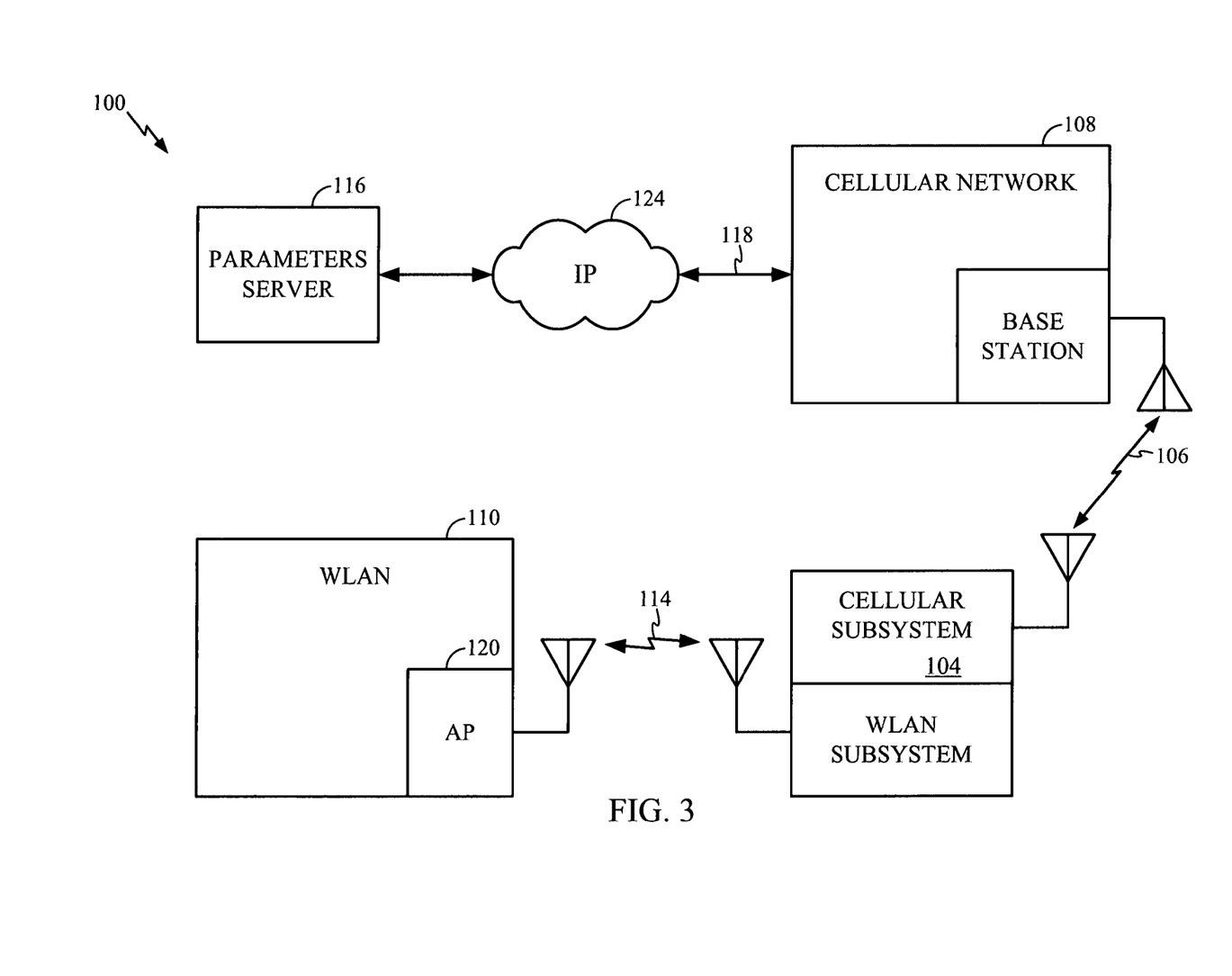
FIG. 3 is a schematic diagram, depicting a particular embodiment of the system of FIG. 1.

FIG. 3 is a schematic diagram, depicting a particular embodiment of the system of FIG. 1. In this example, the first subsystem 104 is a cellular subsystem that establishes a link 106 with cellular telephone network 108. This link is used to download a security key for the second communications network 110 that may be an IEEE 802.11, Bluetooth, WiMax, or IEEE 802.15 network, which will be referred to herein as a WLAN. The WLAN security key may a 64 or 128-bit code for example. Cellular network security features are well established and reasonably robust. Therefore, there is an assumption that access to the parameters server 116, and the distribution of WLAN security keys, is controlled. This same assumption is not necessarily valid if other, less secure networks, are allowed access to the parameters server 116.

For example, if the second network 110 is an IEEE 802.11 network, the downloaded security key may be used to establish a link to an 802.11 AP 120. The WLAN subsystem 112 monitors the IEEE 802.11 network 110 and detects a MAC address or network ID associated (or both) with an AP 120. The cellular subsystem 102 supplies the AP MAC address and network ID to the parameters server 116 via the cellular network 108, and downloads a security key associated with the monitored AP 120.

Returning to FIG. 1, in another aspect not shown, the second communications network 108 may be a cellular network. In this aspect, the first network 108 (i.e., an Ethernet or WLAN) can be used to download identity information (i.e., Subscriber Information Module or SIM for the cellular subsystem 112. Alternately, Electronic Serial Number (ESN) is a number used to identify a particular device or piece of hardware. Mobile Equipment ID (MEID) is likewise a device identifier. International Mobile Subscriber Identity (IMSI) is a number used to identifier a subscriber (phone number) in a cellular network. Mobile Identity Number (MIN) is the 10-digit number previously used in North American networks, which has since been replaced by IMSI. Other types of identifiers can potentially be used, as long as they are known by both the UT and the cellular network. This methodology would be useful for initializing cellular telephones that are shipped without identities, so that this process can be performed at home by a user, or automatically performed at a phone carrier's service facility.

In another aspect of the system, the trust established between the UT and the first network can be leveraged to verify the UT subscriber identity. If the first network is a cellular telephone network, then a high level of trust can be established, as cellular network security procedures are well developed. The access parameters for the second network can be downloaded on the basis of verifying the UT subscriber identity in the cellular network.

For example, a subscriber is assigned a mobile phone number as a result of establishing an account with a cellular network carrier. 802.11 services may be supplied in various places in a city by a WLAN provider. When the subscriber signs up with the WLAN provider, they may give the WLAN provider the UT mobile number, which the WLAN provider cross-references to the subscriber identity in the WLAN network. Now, if the subscriber must acquire a new AP in the WLAN network, the mobile number can be used as a security feature in gaining parameters for the new AP.

The same WLAN server that supplies the access information, can use the cellular network to validate the UT subscriber identity. That is, the WLAN server can use the mobile phone number, which is associated with the cellular network subscription, as an additional validation of the person requesting the access information. The WLAN server can use the services that are indexed using the phone number to deliver the information.

For example, the WLAN server may call the mobile phone number and make sure that the user answering the phone is the actual subscriber. This validation can be done over the data (databurst) channel that is already engaged in the voice call requesting the access parameters. Another option is to use the Short Message Service (SMS) channel. The WLAN server may send the access parameters in an SMS to the subscriber's mobile number. A third option may be to use cellular network data services to perform a mobile terminated data call to the UT.

Functional Description

Figure 4:
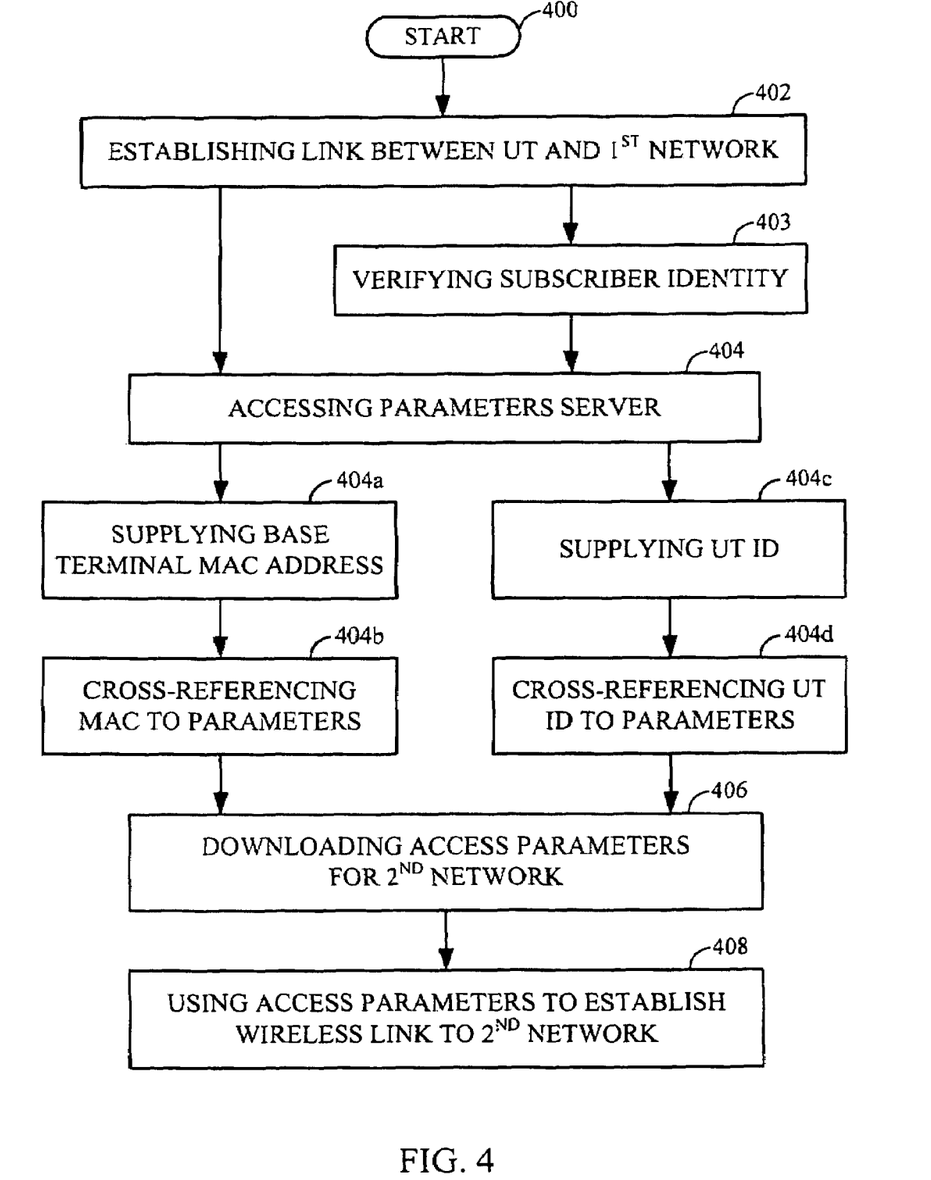
FIG. 4 is a flowchart illustrating a method for distributing wireless network access parameters in a multi-mode communications UT.

FIG. 4 is a flowchart illustrating a method for distributing wireless network access parameters in a multi-mode communications UT. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 400.

Step 402 establishes a link between a UT and a first communications network. Step 404 accesses a parameters server via the first network. Step 406 downloads access parameters for a wireless, second communications network. Step 408 uses the downloaded access parameters to establish a wireless link between the UT and the second communications network.

In one aspect, downloading access parameters for the second communications network in Step 406 includes downloading information such as a security key, SSID, traffic channel allocation, WEP setup information, and optimization parameters. The optimization parameters may include transmit power, receive power, transfer rate, QoS settings, or operational mode.

In another aspect, establishing the link between the UT and the first communications network in Step 402 includes establishing a link to a first communications network such as an Ethernet, IEEE 802.11, IEEE 802.15, Bluetooth, WiMax, or a cellular telephone network. In a different aspect, establishing the link between the UT and the second communications network in Step 408 includes establishing a link to a second communications network such as an IEEE 802.11, Bluetooth, WiMax, IEEE 802.15, or a cellular telephone network.

In one aspect, accessing the parameters server via the first communications network in Step 404 includes substeps. Step 404a supplies a MAC address associated with a second network base terminal. Step 404b accesses a database cross-referencing the MAC address to parameters required to access the base terminal.

In another aspect, accessing the parameters server via the first communications network in Step 404 includes alternate substeps. Step 404c supplies an identity (ID) associated with the UT. Step 404d accesses a database cross-referencing the UT ID to parameters such as QoS, IP address, gateway information, subnet mask, DNS information, and geographical location.

In one example, Step 402 establishes a link with a cellular telephone network, and Step 406 downloads a security key for a second network that may be either an IEEE 802.11, Bluetooth, WiMax, or IEEE 802.15 network. Then, Step 408 uses the security key to establish a link between the UT and a second network.

In one aspect, establishing the link between the UT and the first communications network in Step 402 includes establishing a link with a cellular telephone network, and the method comprises a further step. Step 403 verifies a UT subscriber identity in response to the UT establishing a link with the cellular network. Then, downloading access parameters for the second communications network in Step 406 includes downloading access parameters in response to verifying the UT subscriber identity. For example, Step 406 may download access parameters via a channel such as a cellular network databurst channel, a cellular network Short Message Service (SMS) channel, or a cellular network UT terminated data call. All these download processes automatically verify UT subscriber identity on the basis of trust established between the UT and the cellular network.

Figure 5:
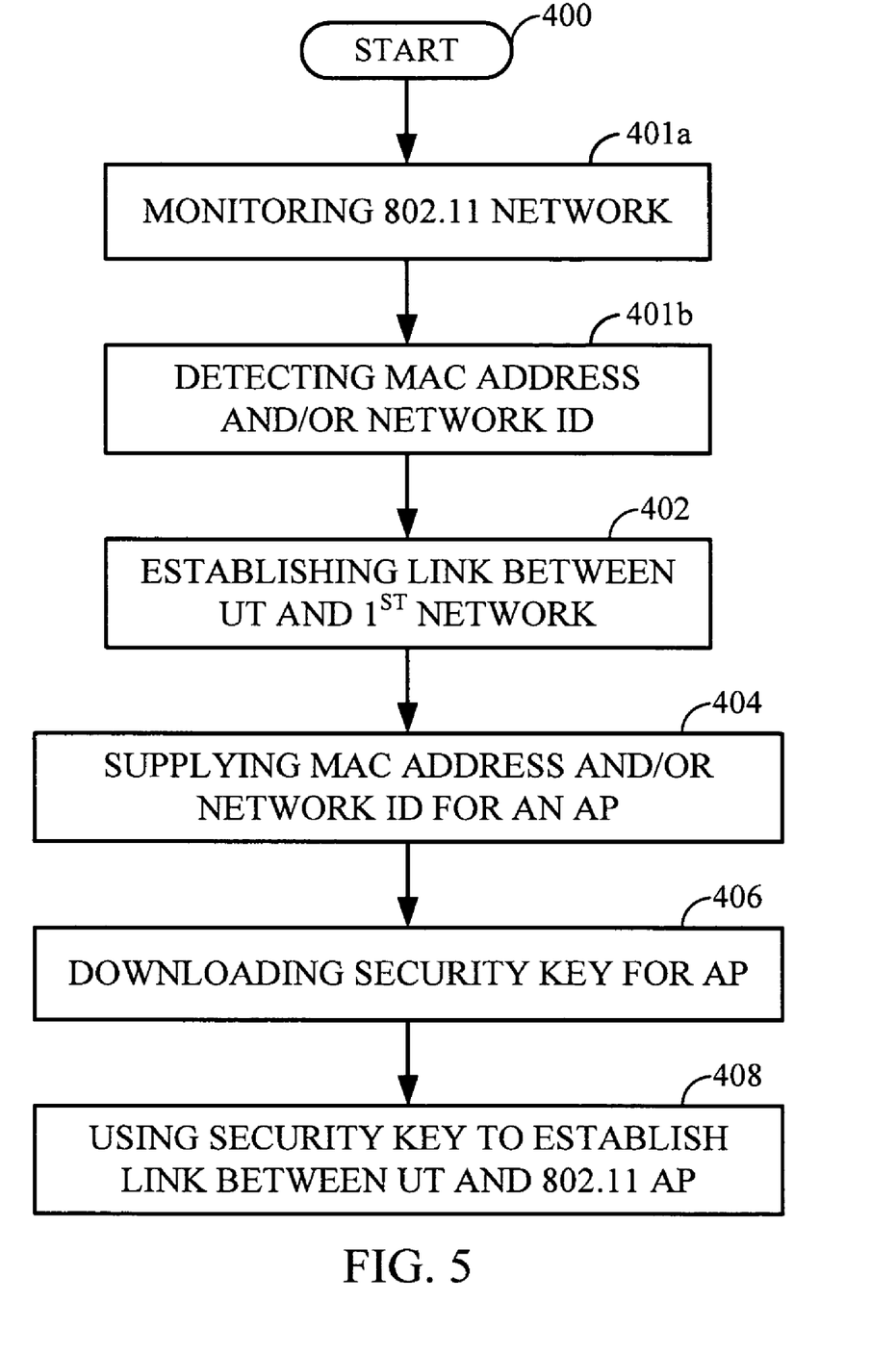
FIG. 5 is a flowchart illustrating a method for distributing IEEE 802.11 access parameters in a multi-mode communications UT.

FIG. 5 is a flowchart illustrating a method for distributing IEEE 802.11 access parameters in a multi-mode communications UT. In this example Step 401a monitors the IEEE 802.11 network. Step 401b detects a MAC address and network ID associated with an AP. Step 402 establishes a link between the UT and a cellular telephone network. Step 404 supplies the AP MAC address and network ID parameters to a parameters server via the cellular network. Step 406 downloads a security key for the monitored AP in the IEEE 802.11 network, and Step 408 uses the security key to establish a link between the UT and a IEEE 802.11 access point (AP).

A system and method for distributing wireless network access parameters in the context of a multi-mode communications UT have been provided. Details of specific network parameters, identification, and security protocols have been presented to help explain the invention. However, the invention is not limited to just these details. Other variations and embodiments of the invention will occur to those skilled in the art.

We claim:

1. In a multi-mode communications user terminal (UT), a method for distributing wireless network access parameters, the method comprising:

monitoring a communication band for a wireless second, communication network;

detecting, on the monitored communication band, at least one identifier corresponding to the wireless second communications network, wherein the UT does not comprise access parameters to access the second wireless communication network;

establishing a link between the UT and a first communications network accessible by the UT;

accessing a parameters server via the first network;

supplying the detected at least one identifier to the parameters server;

downloading access parameters, from the parameters server, for the second communications network based on the detected at least one identifier; and using the downloaded access parameters to establish a wireless link between the UT and the second communications network.

2. The method of claim 1 wherein downloading access parameters for the second communications network includes downloading information selected from the group consisting of a security key, Service Set Identifier (SSID), traffic channel allocation, Wired Equivalent Privacy (WEP) setup data, and optimization parameters including transmit power, receive power, transfer rate, quality of service (QoS) settings, and operational mode.

3. The method of claim 1 wherein establishing the link between the UT and the first communications network includes establishing a link to a first communications network selected from the group consisting of Ethernet, IEEE 802.11, IEEE 802.15, Bluetooth, WiMax, and a cellular telephone network.

4. The method of claim 1 wherein establishing the link between the UT and the second communications network includes establishing a link to a second communications network selected from the group consisting of IEEE 802.11, Bluetooth, WiMax, IEEE 802.15, and a cellular telephone network.

5. The method of claim 1 wherein accessing the parameters server via the first communications network includes:
supplying a Media Access Controller (MAC) address associated with a second network base terminal; and,
accessing a database cross-referencing the MAC address to parameters required to access the base terminal.

6. The method of claim 1 wherein accessing the parameters server via the first communications network includes:
supplying an identity (ID) associated with the UT; and,
accessing a database cross-referencing the UT ID to parameters selected from the group consisting of QoS, IP address, gateway information, subnet mask, Domain Name Server (DNS) information, and geographical location.

7. The method of claim 1 wherein establishing the link between the UT and the first communications network includes establishing a link with a cellular telephone network;
wherein downloading access parameters for the second communications network includes downloading a security key for a second network selected from the group consisting of an IEEE 802.11, Bluetooth, WiMax, and IEEE 802.15 network; and,
wherein using the downloaded access parameters to establish a wireless link between the UT and the second communications network includes using the security key to establish a link between the UT and a second network.

8. The method of claim 1 wherein establishing the link between the UT and the first communications network includes establishing a link with a cellular telephone network;
wherein downloading access parameters for the second communications network includes downloading a security key for an IEEE 802.11 network; and,
wherein using the downloaded access parameters to establish a wireless link between the UT and the second communications network includes using the security key to establish a link between the UT and a IEEE 802.11 access point (AP).

9. The method of claim 8 further comprising:
monitoring the IEEE 802.11 network;
detecting a MAC address and network ID associated with an AP;
wherein accessing the parameters server via the cellular telephone network includes supplying the AP MAC address and network ID to the parameters server; and,
wherein downloading the security key for the IEEE 802.11 network includes downloading a security key associated with the monitored AP.

10. The method of claim 1 wherein establishing the link between the UT and the first communications network includes establishing a link with a cellular telephone network; the method further comprising:
verifying a UT subscriber identity in response to the UT establishing a link with the cellular network; and,
wherein downloading access parameters for the second communications network includes downloading access parameters in response to verifying the UT subscriber identity.

11. The method of claim 10 wherein downloading access parameters in response to verifying the UT subscriber identity includes downloading access parameters via a channel selected from the group consisting of a cellular network databurst channel, a cellular network Short Message Service (SMS) channel, and a cellular network UT terminated data call.

12. In a multi-mode communications user terminal (UT), a system for distributing wireless network access parameters, the system comprising:
a second subsystem for monitoring a communication band for a wireless second communication network, and detecting, on the monitored communication band, at least one identifier corresponding to the wireless second communications network, wherein the UT does not comprise access parameters to access the wireless second network;
a first subsystem for establishing a link between the UT and a first communications network that is accessible by the UT, accessing a parameters server via the first network, supplying the detected at least one identifier to the parameters servers, and downloading, from the parameters server, access parameters for the second communications network based on the detected at least one identifier; and
wherein the second subsystem is further operable for establishing a wireless communications link between the UT and the second communications network using the access parameters downloaded to the first subsystem.

13. The system of claim 12 wherein the first subsystem downloads access parameters for the second communications network selected from the group consisting of a security key, Service Set Identifier (SSID), traffic channel allocation, and optimization parameters including transmit power, receive power, transfer rate, quality of service (QoS) settings, Wired Equivalent Privacy (WEP) setup data, and operational mode.

14. The system of claim 12 wherein the first subsystem establishes a link to a first communications network selected from the group consisting of Ethernet, IEEE 802.11, IEEE 802.15, Bluetooth, WiMax, and a cellular telephone network.

15. The system of claim 12 wherein the second subsystem establishes a link to a second communications network selected from the group consisting of IEEE 802.11, Bluetooth, WiMax, IEEE 802.15, and a cellular telephone network.

16. The system of claim 12 wherein the first subsystem accesses the parameters server by supplying a Media Access Controller (MAC) address associated with a second communications network base terminal, and accesses a database cross-referencing the MAC address to parameters required to access the base terminal.

17. The system of claim 12 wherein the first subsystem accesses the parameters server by supplying an identity (ID) associated with the UT, and accesses a database cross-referencing the UT ID to parameters selected from the group consisting of QoS, IP address, gateway information, subnet mask, Domain Name Server (DNS) information, and geographical location.

18. The system of claim 12 wherein the first, subsystem is a cellular subsystem for establishing a link with cellular telephone network that downloads a security key for the second communications network; and, wherein the second subsystem uses the security key to establish a link between the UT and a second communications network selected from the group consisting of an IEEE 802.11, Bluetooth, WiMax, and IEEE 802.15 network.

19. The system of claim 12 wherein the first subsystem is a cellular subsystem for establishing a link with a cellular telephone network that downloads a security key for an IEEE 802.11 network; and, wherein the second subsystem is a wireless local area network (WLAN) subsystem that uses the security key to establish a link with a IEEE 802.11 access point (AP).

20. The system of claim 19 wherein the WLAN subsystem monitors the IEEE 802.11 network and detects a MAC address and network ID associated with an AP; and, wherein the cellular subsystem supplies the AP MAC address and network ID to the parameters server via the cellular network, and downloads a security key associated with the monitored AP.

21. The system of claim 12 wherein the first subsystem is a wireless cellular telephone network, and wherein the cellular subsystem downloads access parameters for the second communications network in response to verifying a UT subscriber identity.

22. The system of claim 21 wherein the cellular subsystem downloads UT subscriber identity-verified access parameters via a channel selected from the group consisting of a cellular network databurst channel, a cellular network Short Message Service (SMS) channel, and a cellular network UT terminated data call.

23. A system for distributing wireless network access parameters, the system comprising:
a multi-mode user terminal (UT) comprising:
a second subsystem for monitoring a communication band for a wireless second communication network, and detecting, on the monitored communication band, at least one identifier corresponding to the wireless second communications network, wherein the UT does not comprise access parameters to access the wireless second network;
a first subsystem for establishing a link between the UT and a first communications network that is accessible by the UT, accessing a parameters server via the first network, supplying the detected at least one identifier to the parameters servers, and downloading, from the parameters server, access parameters for the second communications network based on the detected at least one identifier; and
wherein the second subsystem is further operable for establishing a wireless communications link between the UT and the second communications network, using the access parameters downloaded to the first subsystem; and
a parameters server having an interface connected to the first network for supplying second network access parameters.

24. At least one processor, comprising:
a second subsystem operable to monitor a communication band for a wireless second communication network, and to cause a user terminal (UT) to detect, on the monitored communication band, at least one identifier corresponding to a wireless second communications network, wherein the UT does not comprise access parameter to access the wireless second network;
a first subsystem operable to cause the UT to establish a link between the UT and a first communications network that is accessible by the UT, access a parameters server via the first network, supply the detected at least one identifier to the parameters server, and download, from the parameters server, access parameters for the second communications network based on the detected at least one identifier; and
wherein the second subsystem is further operable cause the UT to establish a wireless communications link between the UT and the second communications network using the access parameters downloaded to the first subsystem.

25. A multi-mode communications user terminal (UT), comprising:
means for monitoring a communication band for a wireless second communication network,
means for detecting, on the monitored communication band, at least one identifier corresponding to the wireless second communications network, wherein the UT does not comprise access parameters to access the wireless second communication network;
means for establishing a link between the UT and a first communications network that is accessible by the UT;
means for accessing a parameters server via the first network;
means for supplying the detected at least one identifier to the parameters server;
means for downloading access parameters, from the parameters server, for the second communications network based on the detected at least one identifier; and
means for using the downloaded access parameters to establish a wireless link between the UT and the second communications network.

* * * * *